(12) United States Patent
Slat

(10) Patent No.: US 6,319,574 B1
(45) Date of Patent: *Nov. 20, 2001

(54) MULTI-LAYER PLASTIC PREFORM FOR BLOW MOLDING

(75) Inventor: William A. Slat, Brooklyn, MI (US)

(73) Assignee: Plastipak Packaging, Inc., Plymouth, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/499,968

(22) Filed: Feb. 8, 2000

(51) Int. Cl.$^7$ .......................... B29C 49/22; B29C 45/14; B29C 49/06
(52) U.S. Cl. ................ 428/35.7; 428/36.91; 428/542.8; 156/244.13; 264/513; 264/514; 264/515
(58) Field of Search ............................ 428/36.91, 542.8, 428/480, 411.1, 35.7; 156/244.13, 242; 264/513, 514, 454, 464, 478, 516, 515, 510

(56) References Cited

U.S. PATENT DOCUMENTS

| | | | |
|---|---|---|---|
| 3,719,735 | 3/1973 | Valyi | 264/513 |
| 3,787,157 | 1/1974 | Valyi | 425/112 |
| 3,869,056 | 3/1975 | Valyi | 275/12.2 |
| 4,067,944 | 1/1978 | Valyi | 264/513 |
| 4,079,851 | 3/1978 | Valyi | 215/12.2 |
| 4,092,391 | 5/1978 | Valyi | 264/512 |
| 4,149,645 | 4/1979 | Valyi | 215/12.2 |
| 4,219,527 | 8/1980 | Edelman et al. | 264/540 |
| 4,391,861 | 7/1983 | Nilsson | 428/35.7 |
| 4,398,642 | 8/1983 | Okudaira et al. | 428/35.7 |
| 4,535,901 | 8/1985 | Okudaira et al. | 215/12.2 |
| 4,564,541 | 1/1986 | Taira et al. | 428/35.4 |
| 4,646,925 | 3/1987 | Nohara | 428/542.8 |
| 4,728,549 | 3/1988 | Shimizu et al. | 428/36.6 |
| 4,741,936 | 5/1988 | Nohara et al. | 428/367 |
| 4,755,404 | 7/1988 | Collette | 428/36.93 |
| 4,764,403 | 8/1988 | Ajmera | 428/36.7 |
| 4,816,308 | 3/1989 | Shimizu et al. | 428/36.7 |
| 4,861,630 | 8/1989 | Mihalich | 428/34.1 |
| 4,874,647 | 10/1989 | Yatsu et al. | 428/35.7 |
| 4,910,054 | 3/1990 | Collette et al. | 428/35.7 |
| 4,980,211 | 12/1990 | Kushida et al. | 428/36.7 |
| 4,991,734 | 2/1991 | Nilsson et al. | 220/604 |
| 4,994,313 | 2/1991 | Shimizu et al. | 428/367 |
| 5,034,177 | 7/1991 | Niimi et al. | 264/331.21 |
| 5,035,931 | 7/1991 | Yamada et al. | 428/35.7 |
| 5,039,780 | 8/1991 | Hashimoto et al. | 528/194 |
| 5,115,047 | 5/1992 | Hashimoto et al. | 525/444 |
| 5,198,248 | 3/1993 | Krishnakumar et al. | 425/522 |
| 5,256,363 | 10/1993 | Hashimoto et al. | 264/289 |
| 5,281,387 | 1/1994 | Collette et al. | 264/521 |
| 5,286,187 | 2/1994 | Niimi et al. | 425/205 |
| 5,302,686 | 4/1994 | Tanaka et al. | 428/35.7 |
| 5,380,479 | 1/1995 | Schrenk et al. | 428/35.7 |
| 5,439,718 | 8/1995 | Klerks et al. | 428/35.7 |
| 5,443,766 | 8/1995 | Slat et al. | 264/37 |
| 5,582,788 | 12/1996 | Collette et al. | 264/297.2 |
| 5,656,719 | 8/1997 | Stibal et al. | 528/47 |
| 5,804,016 | 9/1998 | Schmidt et al. | 156/242 |
| 5,804,305 | 9/1998 | Slat et al. | 428/36.7 |
| 6,090,337 | * 7/2000 | Slat | 264/513 |

FOREIGN PATENT DOCUMENTS

| | | |
|---|---|---|
| WO 97/01427 | 1/1997 | (WO) . |
| WO 97/32708 | 9/1997 | (WO) . |
| WO 98/06557 | 2/1998 | (WO) . |

\* cited by examiner

*Primary Examiner*—Rena L. Dye
(74) *Attorney, Agent, or Firm*—Brooks & Kushman P.C.

(57) ABSTRACT

A multi-layer plastic preform 14 with an inner layer 28 that is extrusion blow molded from a resin having an intrinsic viscosity greater than 0.90, and an outer layer 44 that is injection molded around the inner layer from a resin having an intrinsic viscosity that is at least 0.10 less than the intrinsic viscosity of the inner layer. The inner layer 28 is no greater than 20% (preferably no greater than 15%) by weight of the total weight of the preform and the outer layer 44 is at least 80% (preferably at least 85%) by weight of the total weight of the preform.

16 Claims, 2 Drawing Sheets

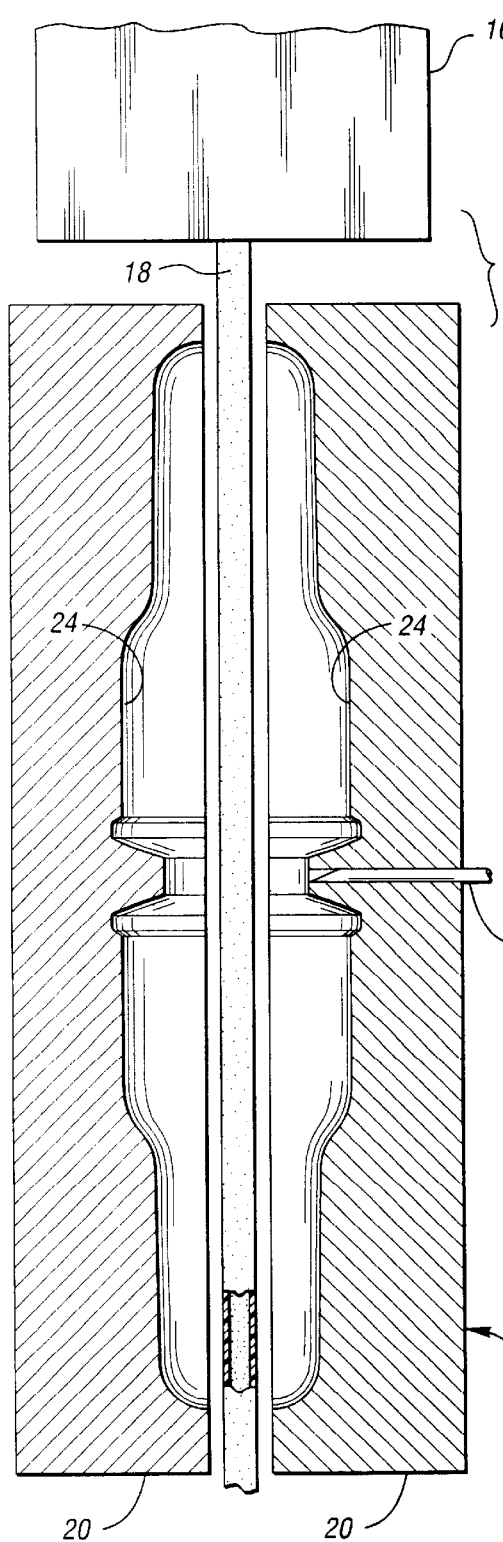
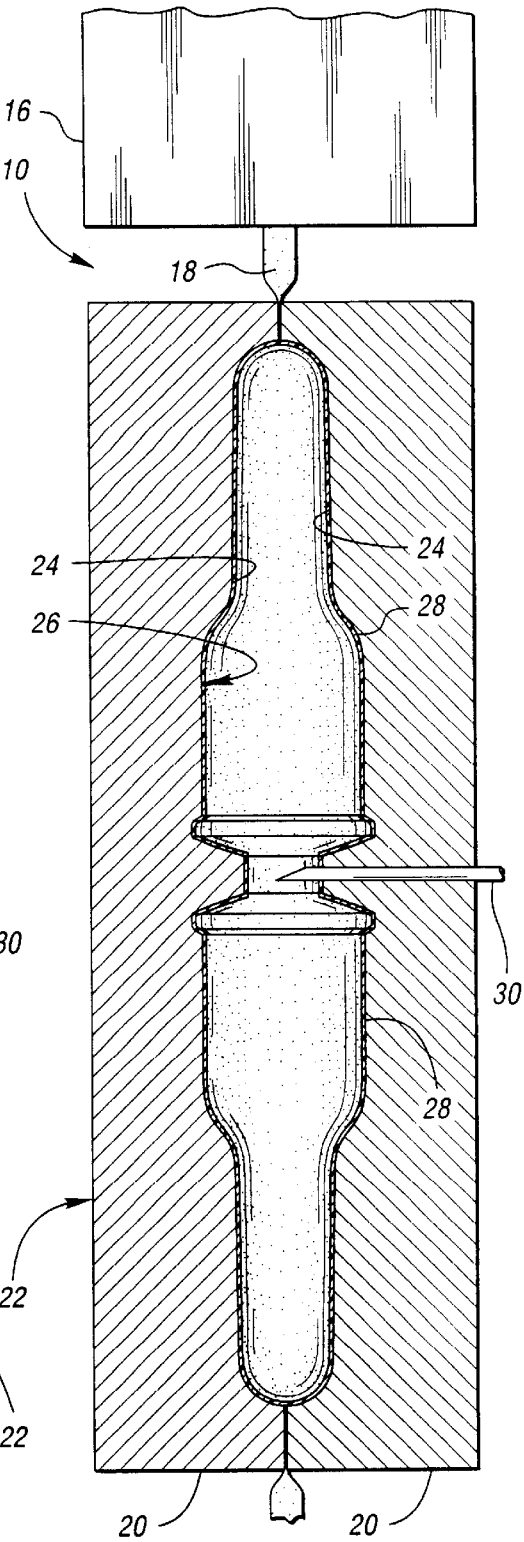

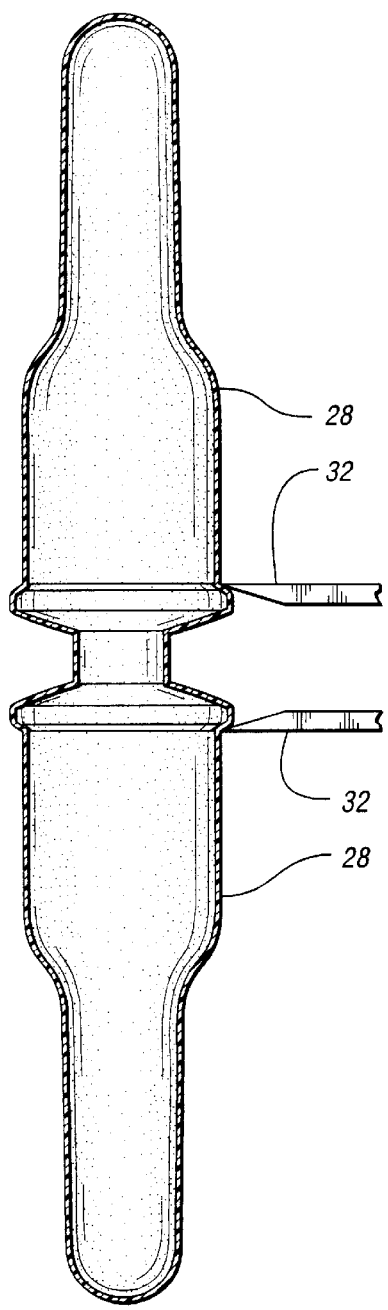
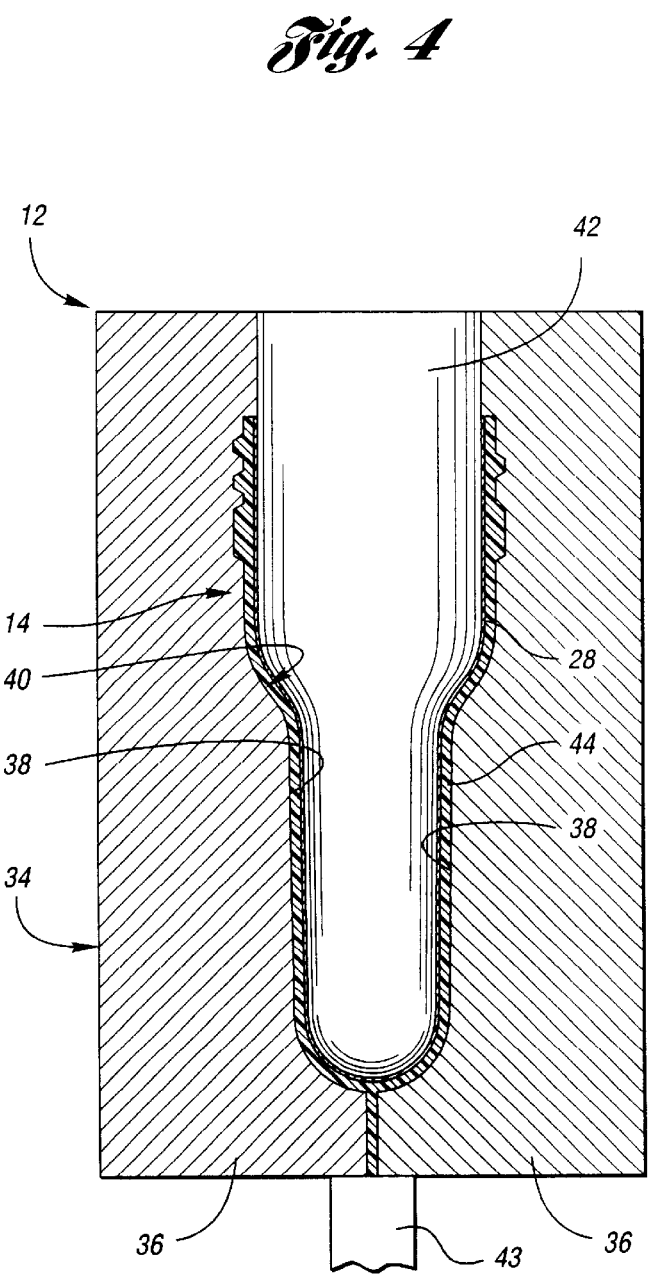

MULTI-LAYER PLASTIC PREFORM FOR BLOW MOLDING

TECHNICAL FIELD

This invention relates to a multi-layer plastic preform for blow molding a container and also relates to the method for making the preform.

BACKGROUND ART

Plastic blow molding of containers is conventionally performed either by extrusion of a hot plastic parison or by a plastic preform which is usually injection molded from plastic. The hot plastic parison or heated preform is received within a mold cavity whereupon pressurized gas provides the blow molding of the container to the shape of the mold cavity.

With certain resins such as polyethylene terephthalate, the resin has to be treated to increase its intrinsic viscosity in order to have sufficient strength to be extruded as a hot parison capable of being blow molded, such as disclosed by U.S. Pat. No. 4,219,527 Etelman et al. Such processing of the resin increases its cost and hence the resultant cost to the consumer.

While preforms for plastic blow molding are conventionally injection molded from a single resin, there have also been prior multi-layer preforms such as disclosed by U.S. Pat. Nos.: 3,719,735 Valyi; 3,787,157 Valyi; 4,067,944 Valyi; 4,391,861 Nilsson; and 4,646,925 Nohara.

Other prior art involving plastic resins, parison extrusion and preforms is disclosed by U.S. Pat. Nos.: 4,398,642 Okudaira et al.; 4,564,541 Taira et al.; 4,728,549 Shimizu et al.; 4,764,403 Ajmera; 4,816,308 Shimizu et al.; 4,861,630 Mihalich; 4,874,647 Yatsu et al.; 4,994,313 Shimizu et al.; 5,034,177 Niimi et al.; 5,039,780 Hashimoto et al.; 5,115,047 Hashimoto et al.; 5,256,363 Hashimoto et al.; 5,281,387 Collette et al.; 5,286,187 Niimi et al.; 5,380,479 Schrenk et al.; and 5,439,718 Klerks et al.

DISCLOSURE OF INVENTION

One object of the present invention is to provide an improved multi-layer plastic preform for blow molding a container.

In carrying out the above object, a multi-layer plastic preform for blow molding a container is constructed to include an inner layer that is extrusion blow molded from a resin having an intrinsic viscosity greater than 0.90. This inner layer is no greater than 20% by weight of the total weight of the preform. An outer layer of the preform is injection molded around the inner layer from a resin having an intrinsic viscosity that is at least 0.10 less than the intrinsic viscosity of the inner layer. The outer layer is at least 80% by weight of the total weight of the preform. Such a preform can be utilized to provide a blow molded container that has good strength characteristics at its bottom end as a result of the higher strength of the inner layer without having the cost disadvantage associated with containers extrusion blow molded entirely from high viscosity resins.

In the preferred construction of the preform, the inner layer is extrusion blow molded from a resin having an intrinsic viscosity greater than 1.0. The preferred construction of the preform also has the inner layer provided so as to be no greater than 15% by weight of the total weight of the preform. In its preferred construction, the inner layer is extrusion blow molded from a resin having an intrinsic viscosity greater than 1.0 and is also no greater than 15% by weight of the total weight of the preform.

The preferred construction of the preform has the outer layer injection molded from a resin having an intrinsic viscosity that is at least 0.15 less than the intrinsic viscosity of the inner layer. The outer layer is also preferably at least 85% by weight of the total weight of the preform. In the preferred construction, the preform is injection molded from a resin having an intrinsic viscosity that is at least 0.15 less than the intrinsic viscosity of the inner layer and is also at least 85% by weight of the total weight of the preform.

Different constructions are possible with the plastic preform. Specifically, the inner and outer layers can be made of the same type of resin or of different types of resin. The inner and outer layers can both be made of virgin resin, or the inner layer can be made of virgin resin and the outer layer made of post consumer recycled resin. The inner layer preferably defines the entirety of an inner surface of the preform. The outer layer preferably defines the entirety of an exterior surface of the preform. In the preferred construction, the inner layer defines the entirety of an inner surface of the preform and the outer layer defines the entirety of the exterior surface of the preform.

The objects, features and advantages of the present invention are readily apparent from the following detailed description of the best mode for carrying out the invention when taken in connection with the accompanying drawings.

BRIEF DESCRIPTION OF DRAWINGS

FIG. 1 is a sectional view taken through extrusion blow molding apparatus for extruding a parison between open mold sections of a mold.

FIG. 2 is a view similar to FIG. 1 but showing the apparatus after the mold has been closed to blow mold the extruded parison to provide a pair of preform inner layers.

FIG. 3 is a view illustrating how the pair of preform inner layers are separated from each other.

FIG. 4 is a view that illustrates injection molding apparatus for injection molding an outer layer around the inner layer to provide a multi-layer preform.

BEST MODE FOR CARRYING OUT THE INVENTION

The drawings illustrate extrusion apparatus 10 (FIGS. 1 and 2) and injection molding apparatus 12 (FIG. 4) for making a multi-layer plastic preform 14 for blow molding a container in accordance with the invention. The construction of the preform 14 as shown in FIG. 4 and the method for making the preform in accordance with the invention will be described in an integrated manner to facilitate an understanding of the different aspects of the invention.

With reference to FIG. 1 of the drawings, the extrusion apparatus 10 includes an extruder 16 that extrudes a hot tubular parison 18 of plastic resin between open mold sections 20 of an open blow mold 22. The resin from which the parison 18 is extruded has an intrinsic viscosity greater than 0.90. The mold sections 20 of the blow mold 22 have cavity sections 24 that cooperatively define an enclosed cavity 26 upon closing of the mold 22 as shown in FIG. 2. The mold cavity 26 defines the shape of a pair of inner layers 28 of the preform. One of the mold sections 20 includes a blow needle 30 that is inserted into the parison 18 upon the mold closing to blow mold the parison to the shape of the mold cavity 26 in order to provide the pair of inner layers 28 that are connected at their ends which are located adjacent the open ends of the resultant preform after its injection molding as is hereinafter more fully described.

After the extrusion and blow molding of the inner layers 28 as illustrated in FIG. 1, the mold 22 is opened to remove the connected inner layers 28 which are then separated from each other in any suitable manner such as by cutting by the schematically illustrated knives 32 shown in FIG. 2.

With reference to FIG. 4, the injection molding apparatus 12 includes a mold 34 having a pair of mold sections 36 that define mold cavity sections 38 for cooperatively defining a mold cavity 40 in the closed position illustrated. The extruded inner layer 28 illustrated is positioned on a core pin 42 of the injection molding apparatus 12 and is received within the cavity 40 of the closed mold 34 to commence the injection molding processing. An injector 43 injects a resin into the cavity 40 about the inner layer 38 to provide an outer layer 44 of the preform. The resin from which this injection molding is performed has an intrinsic viscosity that is at least 0.10 less than the intrinsic viscosity of the inner layer 28.

The multi-layer preform 14 has its inner layer 28 being no greater than 20% by weight of the total weight of the preform 14 and has its outer layer 44 being at least 80% by weight of the total weight of the preform. This construction provides a preform that can be economically produced and blow molded to provide a container that has good strength characteristics at its base as a result of the inner layer with the greater viscosity and consequent strength.

In the preferred construction, the inner layer 28 is extrusion blow molded from a resin having an intrinsic viscosity greater than 1.0 and is no greater than 15% by weight of the total weight of the preform. Furthermore, the outer layer 44 is preferably injection molded from a resin having an intrinsic viscosity that is at least 0.15 less than the intrinsic viscosity of the inner layer 28, and the outer layer is preferably at least 85% by weight of the total weight of the preform.

The construction of the multi-layer preform 14 can have the inner and outer layers 28 and 44 made of the same type of resin or of different types of resin. Furthermore, the inner and outer layers 28 and 44 can both be made of virgin resin. In addition, it is possible for the inner layer 28 to be made of virgin resin and the outer layer 44 to be made of post consumer recycled resin. The inner layer 28 defines the entirety of an interior surface of the preform 14, while the outer layer 44 defines the entirety of an exterior surface of the preform. This construction allows the inner layer 28 to be made of virgin resin that contacts the container contents upon blow molding of the container, while the outer layer 44 can be made of post-consumer recycled resin since it does not contact the container contents.

While the best mode for carrying out the invention has been described in detail, those familiar with the art to which this invention relates will recognize various alternative ways of practicing the invention as defined by the following claims.

What is claimed is:

1. A multi-layer plastic preform for blow molding a container, comprising:
    an inner layer that is extrusion blow molded from a resin having an intrinsic viscosity greater than 0.90, and the inner layer being no greater than 20% by weight of the total weight of the preform; and
    an outer layer that is injection molded around the inner layer from a resin having an intrinsic viscosity that is at least 0.10 less than the intrinsic viscosity of the inner layer, and the outer layer being at least 80% by weight of the total weight of the preform.

2. A multi-layer plastic preform as in claim 1 wherein the inner layer is extrusion blow molded from a resin having an intrinsic viscosity greater than 1.0.

3. A multi-layer plastic preform as in claim 1 wherein the inner layer is no greater than 15% by weight of the total weight of the preform.

4. A multi-layer plastic preform as in claim 1 wherein the inner layer is extrusion blow molded from a resin having an intrinsic viscosity greater than 1.0, and the inner layer being no greater than 15% by weight of the total weight of the preform.

5. A multi-layer plastic preform as in claim 1 wherein the outer layer is injection molded from a resin having an intrinsic viscosity that is at least 0.15 less than the intrinsic viscosity of the inner layer.

6. A multi-layer plastic preform as in claim 1 wherein the outer layer is at least 85% by weight of the total weight of the preform.

7. A multi-layer plastic preform as in claim 1 wherein the outer layer is injection molded from a resin having an intrinsic viscosity that is at least 0.15 less than the intrinsic viscosity of the inner layer, and the outer layer being at least 85% by weight of the total weight of the preform.

8. A multi-layer plastic preform as in claim 1 wherein the inner and outer layers are made of the same resin.

9. A multi-layer plastic preform as in claim 1 wherein the inner and outer layers are made of different resins.

10. A multi-layer plastic preform as in claim 1 wherein the inner and outer layers are both of virgin resin.

11. A multi-layer plastic preform as in claim 1 wherein the inner layer is of virgin resin and the outer layer is of post consumer recycled resin.

12. A multi-layer plastic preform as in claim 1 wherein the inner layer defines the entirety of an interior surface of the preform.

13. A multi-layer plastic preform as in claim 1 wherein the outer layer defines the entirety of an exterior surface of the preform.

14. A multi-layer plastic preform as in claim 1 wherein the inner layer defines the entirety of an interior surface of the preform, and the outer layer defining the entirety of an exterior surface of the preform.

15. A multi-layer plastic preform for blow molding a container, comprising:
    an inner layer that is extrusion blow molded from a resin having an intrinsic viscosity greater than 1.0, and the inner layer being no greater than 15% by weight of the total weight of the preform; and
    an outer layer that is injection molded around the inner layer from a resin having an intrinsic viscosity that is at least 0.15 less than the intrinsic viscosity of the inner layer, and the outer layer being at least 85% by weight of the total weight of the preform.

16. A multi-layer plastic preform for blow molding a container and made by the method comprising:
    extruding a resin having an intrinsic viscosity greater than 0.90 as a parison of a tubular shape;
    blow molding the parison to provide an inner layer that is no greater than 20% by weight of the total weight of the preform; and
    injection molding a round the inner layer an outer layer of a resin having an intrinsic viscosity that is at least 0.10 less than the intrinsic viscosity of the inner layer, and the outer layer being at least 80% by weight of the total weight of the preform.

* * * * *

UNITED STATES PATENT AND TRADEMARK OFFICE
CERTIFICATE OF CORRECTION

PATENT NO. : 6,319,574 B1
DATED : November 20, 2001
INVENTOR(S) : William A. Slat It is certified that error appears in the above-identified patent and that said Letters Patent is hereby corrected as shown below:

<u>Title page,</u>
Item [63], Related U.S. Application Data, please insert -- This application is a Divisional of 08/903,447, filed July 30, 1997. --

<u>Column 4,</u>
Line 61, please replace "a round" with -- around --.

Signed and Sealed this

Third Day of September, 2002

*Attest:*

*Attesting Officer*

JAMES E. ROGAN
*Director of the United States Patent and Trademark Office*